United States Patent
Swartling et al.

(10) Patent No.: US 8,909,445 B2
(45) Date of Patent: Dec. 9, 2014

(54) METHOD FOR DETERMINATION OF GEARSHIFT POINTS

(75) Inventors: Fredrik Swartling, Södertälje (SE); Anders Kjell, Bromma (SE); Tom Nyström, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/393,404

(22) PCT Filed: Sep. 10, 2010

(86) PCT No.: PCT/SE2010/050958
§ 371 (c)(1),
(2), (4) Date: Feb. 29, 2012

(87) PCT Pub. No.: WO2011/031216
PCT Pub. Date: Mar. 17, 2011

(65) Prior Publication Data
US 2012/0173102 A1    Jul. 5, 2012

(30) Foreign Application Priority Data
Sep. 14, 2009  (SE) ...................................... 0950668

(51) Int. Cl.
| | |
|---|---|
| G06F 17/00 | (2006.01) |
| B60W 10/00 | (2006.01) |
| F16H 61/00 | (2006.01) |
| F16H 61/02 | (2006.01) |
| F16H 59/48 | (2006.01) |
| F16H 61/16 | (2006.01) |
| F16H 59/36 | (2006.01) |

(52) U.S. Cl.
CPC ............ *F16H 61/0213* (2013.01); *F16H 59/48* (2013.01); *F16H 2061/161* (2013.01); *F16H 2059/363* (2013.01); *F16H 2061/0227* (2013.01); *F16H 2059/366* (2013.01)
USPC ................... 701/66; 701/51; 701/62; 701/64; 477/34; 477/148

(58) Field of Classification Search
CPC ............ F16H 2061/0227; F16H 59/48; F16H 61/0213; F16H 2061/161; F16H 2059/363; F16H 2059/366
USPC ...................... 701/66, 62, 64, 51; 477/148, 34
See application file for complete search history.

(56) References Cited

U.S. PATENT DOCUMENTS 4,254,672 A * 3/1981 Mizuno et al. ................... 477/69
4,485,367 A * 11/1984 Hashizume ...................... 336/57

(Continued)

FOREIGN PATENT DOCUMENTS

| DE | 199 62 962 A1 | 6/2001 |
| EP | 0 352 551 A2 | 1/1990 |

(Continued)

OTHER PUBLICATIONS

International Search Report dated Dec. 14, 2010, issued in corresponding international application No. PCT/SE2010/050958.

(Continued)

*Primary Examiner* — Calvin Cheung
*Assistant Examiner* — Angelina Shudy
(74) *Attorney, Agent, or Firm* — Ostrolenk Faber LLP (57) ABSTRACT

The present invention relates to a method for determination of one or more shift points for a gearbox in a motor vehicle which comprises an engine connected to, in order to drive, said gearbox, where a shift point represents an engine speed at which said gearbox is adapted to effecting a downshift or upshift, said one or more shift points are determined on the basis of an engine target speed $\omega_T$ and a first engine speed difference $\Delta\omega_{TT}$, said target speed $\omega_T$ is a desired speed for said engine, said first engine speed difference $\Delta\omega_{TT}$ is a difference between a first engine speed at a first time $t_1$ and said target speed $\omega_T$ at a second time $t_2$, and said first and second times $t_1$ and $t_2$ are separated by a time period T. The invention relates also to a system, a motor vehicle, a computer program and a computer program product thereof.

19 Claims, 3 Drawing Sheets

(56) References Cited

U.S. PATENT DOCUMENTS

| | | | | |
|---|---|---|---|---|
| 4,569,255 A * | 2/1986 | Holmes | 477/123 |
| 4,576,065 A * | 3/1986 | Speranza et al. | 701/55 |
| 4,579,021 A * | 4/1986 | Yamamuro et al. | 477/45 |
| 4,732,055 A * | 3/1988 | Tateno et al. | 477/73 |
| 4,770,064 A * | 9/1988 | Kuerschner | 477/109 |
| 4,817,776 A * | 4/1989 | Tateno et al. | 477/78 |
| 4,853,673 A * | 8/1989 | Kido et al. | 340/439 |
| 4,853,857 A * | 8/1989 | Oshiage et al. | 701/60 |
| 4,897,790 A * | 1/1990 | Bieber | 701/56 |
| 4,947,331 A * | 8/1990 | Speranza | 701/55 |
| 5,002,027 A * | 3/1991 | Jautelat et al. | 123/339.21 |
| 5,166,879 A * | 11/1992 | Greene et al. | 701/62 |
| 5,233,523 A * | 8/1993 | Follmer | 701/51 |
| 5,245,893 A * | 9/1993 | Koenig et al. | 477/120 |
| 5,256,115 A * | 10/1993 | Scholder et al. | 482/6 |
| 5,319,998 A * | 6/1994 | Iwatsuki et al. | 477/149 |
| 5,335,566 A * | 8/1994 | Genise et al. | 477/124 |
| 5,425,689 A * | 6/1995 | Genise | 477/120 |
| 5,460,583 A * | 10/1995 | Kitada et al. | 477/154 |
| 5,479,345 A | 12/1995 | Amsallen | |
| 5,533,946 A * | 7/1996 | Markyvech | 477/78 |
| 5,568,748 A | 10/1996 | Carlson et al. | |
| 5,647,819 A * | 7/1997 | Fujita et al. | 477/140 |
| 5,730,682 A | 3/1998 | Depping et al. | |
| 5,954,776 A * | 9/1999 | Saito et al. | 701/51 |
| 5,995,896 A * | 11/1999 | Depping et al. | 701/51 |
| 6,067,495 A | 5/2000 | Fliearman et al. | |
| 6,098,003 A * | 8/2000 | Kozaki et al. | 701/51 |
| 6,246,942 B1 * | 6/2001 | Dobler et al. | 701/51 |
| 6,530,292 B1 | 3/2003 | Loeffler et al. | 74/336 |
| 6,616,575 B1 * | 9/2003 | Lorentz | 477/115 |
| 7,578,766 B2 * | 8/2009 | Watanabe et al. | 477/107 |
| 7,993,241 B2 * | 8/2011 | Schaarschmidt et al. | 477/80 |
| 8,108,113 B2 * | 1/2012 | Seufert | 701/62 |
| 8,165,766 B2 * | 4/2012 | Muller et al. | 701/66 |
| 8,190,340 B2 * | 5/2012 | Yamada | 701/55 |
| 8,265,840 B2 * | 9/2012 | Watanabe et al. | 701/61 |
| 8,744,703 B2 * | 6/2014 | Swartling et al. | 701/51 |
| 2001/0032044 A1 * | 10/2001 | Hanawa et al. | 701/51 |
| 2002/0072449 A1 * | 6/2002 | Iwase et al. | 477/97 |
| 2002/0160880 A1 * | 10/2002 | Sekii et al. | 477/143 |
| 2004/0153232 A1 | 8/2004 | Wada et al. | |
| 2004/0162659 A1 * | 8/2004 | Henneken et al. | 701/54 |
| 2005/0177301 A1 * | 8/2005 | Bishop et al. | 701/104 |
| 2008/0070737 A1 * | 3/2008 | Shiohara | 475/160 |
| 2008/0083292 A1 * | 4/2008 | Muta et al. | 74/336 R |
| 2008/0125946 A1 | 5/2008 | Fakler et al. | |
| 2008/0254937 A1 * | 10/2008 | Makiyama | 477/47 |
| 2009/0018732 A1 | 1/2009 | Choby et al. | 701/51 |
| 2009/0076692 A1 * | 3/2009 | Aigner et al. | 701/55 |
| 2009/0118096 A1 * | 5/2009 | Boutell | 477/120 |
| 2009/0139320 A1 * | 6/2009 | Bulgrien | 73/115.02 |
| 2009/0182487 A1 * | 7/2009 | Halleberg et al. | 701/106 |
| 2009/0192020 A1 * | 7/2009 | Futamura et al. | 477/199 |
| 2009/0228179 A1 * | 9/2009 | Yamada | 701/55 |
| 2009/0265067 A1 * | 10/2009 | Wolfgang et al. | 701/58 |
| 2009/0319141 A1 * | 12/2009 | Suzuki et al. | 701/58 |
| 2009/0326771 A1 * | 12/2009 | Murayama et al. | 701/54 |
| 2010/0185370 A1 * | 7/2010 | Wurthner et al. | 701/61 |
| 2010/0262345 A1 * | 10/2010 | Sawada et al. | 701/58 |
| 2013/0172147 A1 * | 7/2013 | Razaznejad et al. | 477/77 |

FOREIGN PATENT DOCUMENTS

| | | |
|---|---|---|
| EP | 0 578 398 A2 | 1/1994 |
| EP | 2 050 989 A1 | 4/2009 |
| WO | WO 2007118783 A1 * | 10/2007 |
| WO | WO 2009007218 A1 * | 1/2009 |
| WO | WO 2009013004 A2 * | 1/2009 |

OTHER PUBLICATIONS

European Search Report mailed Apr. 29, 2013 in corresponding European Patent Application No. 10815699.3.
Chinese Office Action mailed Jan. 20, 2014 in counterpart Chinese Application No. 201080040558.2, along with an English translation of relevant portions thereof.

* cited by examiner

Fig. 1

PRIOR ART

METHOD FOR DETERMINATION OF GEARSHIFT POINTS

CROSS-REFERENCE TO RELATED APPLICATIONS

The present application is a 35 U.S.C. §§371 national phase conversion of PCT/SE2010/050958, filed Sep. 10, 2010, which claims priority of Swedish Application No. 0950668-4, filed Sep. 14, 2009, the contents of which are incorporated by reference herein. The PCT International Application was published in the English language.

TECHNICAL FIELD

The present invention relates to a method for determination of one or more shift points for a gearbox in a motor vehicle. The invention further relates to a system for performing the method, a motor vehicle which performs the method using the system, a computer program and a computer program product thereof used in the system for performing the method.

BACKGROUND TO THE INVENTION

Figure 1:
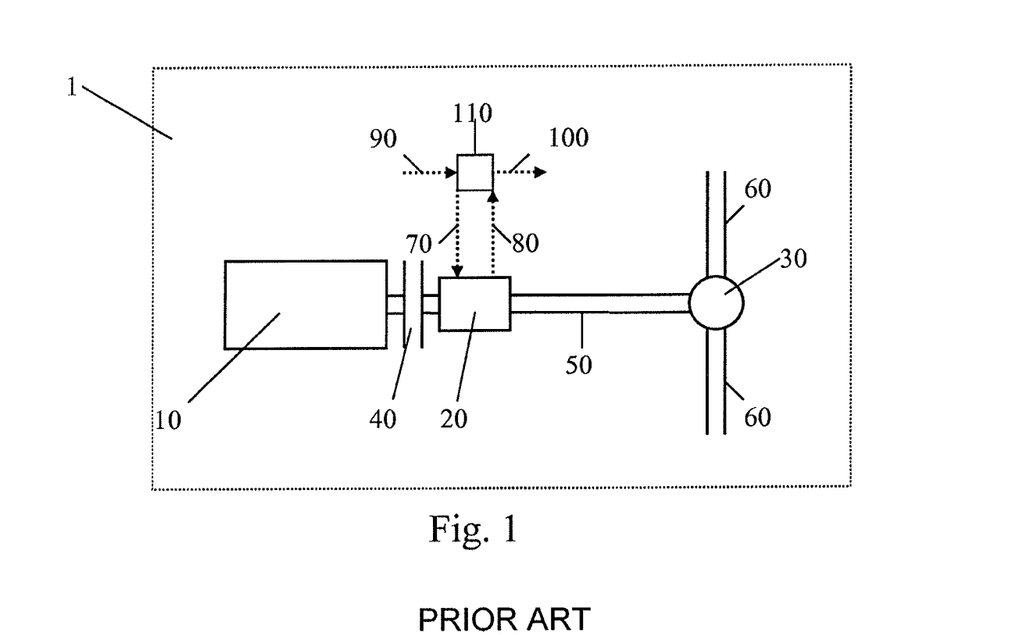
FIG. 1 depicts schematically part of a power train for a motor vehicle.

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

US Patent Publication 20080125946 refers to a method for determination of gear transmission ratio changes for an electronically controlled gearbox.

U.S. Pat. No. 5,479,345 further refers to a method and a device for choosing gearshift points. The factors of road gradient, the vehicle's speed and gross weight relative to the power, in hp, needed to maintain current running speed, and the engine speed and available power expected upon completion of a gear change are taken into account in determining whether a gear change is or is not allowed.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more steps are possible.

Figure 2:
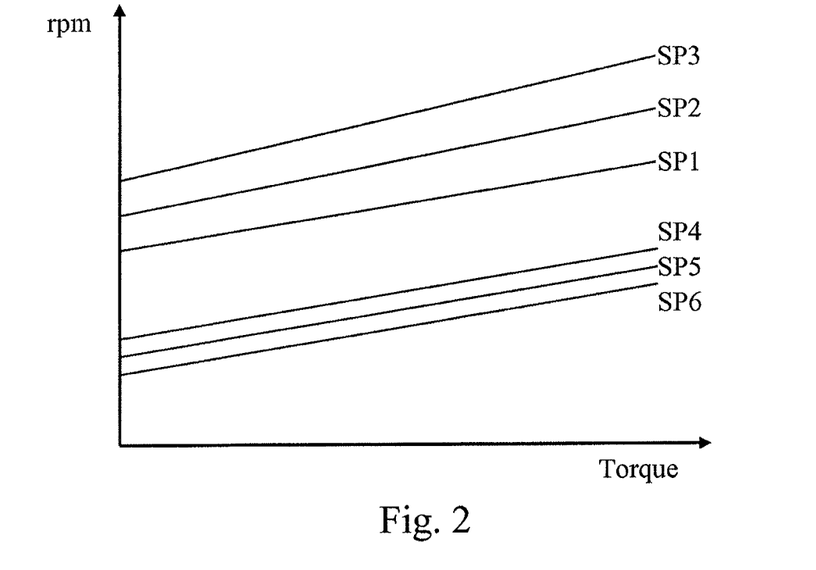
FIG. 2 is a schematic graph of downshift and upshift lines.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and similarly a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights.

A difficulty in choosing shift points is the desire for them to be appropriate to prevailing circumstances when the vehicle is in motion. For example, it is usual for a driver to change gear earlier on a downgrade than on an upgrade, since this makes it possible for the engine to cope with the climb, and it is also usual for the driver to change gear at higher engine speeds if the vehicle is heavily laden, since more power is then needed.

BRIEF DESCRIPTION OF THE INVENTION

An object of the present invention is to propose an alternative method for determining one or more shift points. Another object of the invention is to propose a method which totally or partly solves the problems of the state of the art. A further object of the invention is to propose a method which provides a better drivability sensation and at the same time a simple way of allowing that sensation to be altered.

According to an aspect of the invention, the above objects are achieved with a method for determination of one or more shift points for a gearbox in a motor vehicle which comprises an engine connected to, in order to drive, said gearbox, where a shift point represents an engine speed at which said gearbox is adapted to effecting a downshift or upshift, said one or more shift points are determined on the basis of an engine target speed $\omega_T$ and a first engine speed difference $\Delta\omega_{TT}$, said target speed $\omega_T$ is a desired speed for said engine, said first speed difference $\Delta\omega_{TT}$ is a difference between a first engine speed at a first time $t_1$ and said target speed $\omega_T$ at a second time $t_2$, and said first and second times $t_1$ and $t_2$ are separated by a time period T.

The invention further relates to a computer program comprising program code which, when the program code is executed in a computer, causes the computer to effect the method herein disclosed. The invention further relates to a computer program product belonging to the computer program.

According to another aspect of the invention, the above objects are achieved with a system for determination of one or more shift points, comprising at least one control unit adapted to controlling a gearbox in a motor vehicle which comprises an engine connected to, in order to drive, said gearbox, where a shift point represents an engine speed at which said gearbox is adapted to effecting a downshift or upshift, said one or more shift points are determined on the basis of an engine target speed $\omega_T$ and a first engine speed difference $\Delta\omega_{TT}$, said target speed $\omega_T$ is a desired speed for said engine, said first speed difference $\Delta\omega_{TT}$ is a difference between a first engine speed at a first time $t_1$ and said target speed $\omega_T$ at a second time $t_2$, and said first and second times $t_1$ and $t_2$ are separated by a time period T.

The system according to the invention may also be modified according to the various embodiments of the above method. The invention further relates to a motor vehicle which comprises at least one system as above.

An advantage of a method and a system according to the invention is the provision of an improved drivability sensation in that the shift points depend on an engine target speed and a first engine speed difference. Taking various running conditions (e.g. changes in road gradient and vehicle weight) into account when determining the shift points results in a drivability sensation which is adaptable to different running conditions. Drivability sensation is also easy to alter, making it possible for the drivability sensation to be tailored to different requirements which may arise. Another advantage of the invention is that the vehicle aims at a desired engine speed, with the result that the engine can run at a speed at which it works best.

A further advantage of the invention is that the first engine speed difference $\Delta\omega_{TT}$ will depend on how much torque an engine can deliver. With the same value of T, the more powerful the engine, the greater $\Delta\omega_{TT}$ will be. The shift points are thus adjusted automatically to different engine types, so the gear change system need not be adjusted specifically for each engine type.

Further advantages and applications of a method and a system according to the invention are indicated by the detailed description set out below.

BRIEF DESCRIPTION OF THE DRAWINGS

In the detailed description of the present invention set out below, embodiments of the invention are described with reference to the attached drawings, in which.

DETAILED DESCRIPTION OF THE INVENTION

The present invention relates to determination of one or more shift points for a gearbox 20 preferably situated in a motor vehicle 1. A shift point represents an engine speed at which the gearbox 20 is respectively adapted to effecting a downshift or upshift. The engine speed for upshift points is higher than the engine speed for downshift points.

According to the invention, shift points are determined on the basis of an engine target speed $\omega_T$ and a first engine speed difference $\Delta\omega_{TT}$. The target speed $\omega_T$ is a desired speed for the engine 10 and can be determined on the basis of assumptions and knowledge about the mode of operation and performance of the engine 10. An engine 10 usually runs more efficiently and better at certain engine speeds than others. Efficiently and better may mean less fuel consumption, lower vibration levels and quieter operation. The target speed $\omega_T$ may be within the range of 500-2500 rpm for the engine 10, and preferably within the range of 1000-1400 rpm.

Figure 3:
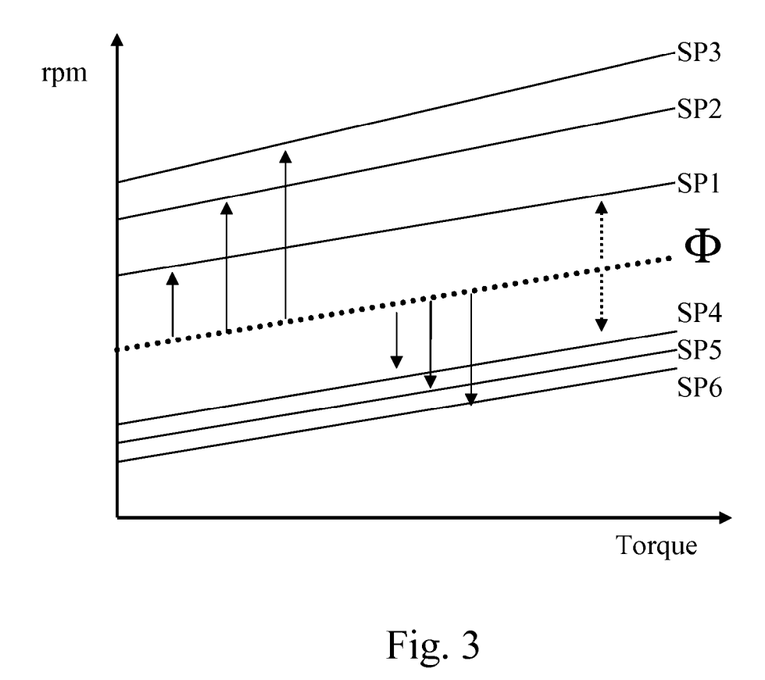
FIG. 3 is a graph of downshift and upshift lines related to an engine target speed line.

In FIG. 3 an engine target speed line $\Phi$ in the form of a dotted line appears between upshift lines SP1-SP3 and downshift lines SP4-SP6. Arrows in the diagram show how upshift lines SP1-SP3 and downshift lines SP4-SP6 are related to the target speed line $\Phi$. This means that if the target speed line $\Phi$ is altered (by being moved upwards or downwards in parallel according to the dotted arrows) the engine speed for the shift lines SP1-SP6 will also move in parallel. The shift lines SP1-SP6 may for example accompany the target speed line $\Phi$ proportionally with a scale factor which may be different for upshift and downshift lines respectively but may also be the same, in which case an established mutual relationship between the upshift and downshift points is achieved. It is also possible to have an individual scale factor for each shift line SP1-SP6, i.e. certain shift lines SP1-SP6 may change more or less than other shift lines SP1-SP6 in response to the same change in the target speed line $\Phi$.

The first engine speed difference $\Delta\omega_{TT}$ is defined as a difference between a first engine speed and the target speed $\omega_T$ which are separated by a time period T. The first speed difference $\Delta\omega_{TT}$ may be construed as a drivability parameter relative to a desired speed for the engine 10, i.e. the target speed $\omega_T$.

An advantage of the invention is that it is possible to effect gear changes appropriate to running conditions, since the invention provides a solution involving a dynamic drivability parameter in the form of a first engine speed difference $\Delta\omega_{TT}$ which defines a range of engine speed. This means that the shift points are automatically raised if the weight of the vehicle 1 increases (e.g. by being loaded), the vehicle 1 embarks upon an upgrade, the engine 10 is weak or the gear changing of the vehicle 1 is rapid, etc., and conversely that the shift points are automatically lowered if opposite conditions occur.

For solutions according to the invention to be felt to be intelligent and dynamic, the engine speed when the gear goes in, i.e. $\omega_T - \Delta\omega_{TT}$, is calculated as a function of how much the vehicle 1 can accelerate after changing gear, $\omega_T$ being a target speed at which it is appropriate for the engine 10 to run. When the engine speed after changing gear, $\omega_T - \Delta\omega_{TT}$, is established, a shift point can then be calculated by the notional gear change being simulated backwards, i.e. starting from reaching a desired speed $\omega_T$ after changing gear, and the gear change being simulated backwards from a notional gear, after changing gear, to a current gear, the current gear being the gear which the gearbox 20 is in at the time, thus arriving at the shift point for notional gear change. This means that the shift points in a preferred embodiment calculated in real time by simulation as described above are calculated while the vehicle 1 is in motion.

Assuming the relationships in equations (1) to (3)

$$M = J\dot{\omega} \quad (1)$$

$$M = M_e - \frac{F_{res} r}{i} \quad (2)$$

$$J = m + I_e \frac{i^2}{r^2} \quad (3)$$

where M is accelerating torque, J the vehicle's inertia, $\omega$ the engine speed, $M_e$ the torque for the engine's flywheel, $F_{res}$ running resistance, r the wheel radius, i total transmission ratio, m the weight of the vehicle and $I_e$ the engine's moment of inertia; which relationships are expressed by equation (4)

$$\frac{d\omega}{dt} = \dot{\omega} = \frac{M}{J} = \frac{M_e - \frac{F_{res} r}{i}}{m + I_e \frac{i^2}{r^2}} \quad (4)$$

which means that the difference in engine speed between a speed at time $t_1$ and a target speed $\omega_T$ at time $t_2$, $\Delta\omega_{TT}$, is expressed by equation (5) according to an embodiment of the invention $$\Delta\omega_{TT} = \int_{t_1}^{t_2} \frac{M_e - \frac{F_{res} r}{i}}{m + I_e \frac{i^2}{r^2}} dt \quad (5)$$

According to another embodiment of the invention, it is also possible to take into account the engine speed difference during the time for an upshift $\Delta\omega_S$, i.e. the time during which the whole upshift operation takes (from the upshift being initiated to its being completed), which usually assumes in the case of an upshift a negative value (e.g. −300 rpm for a single-step upshift). The engine speed during upshift $\omega_{US}$ becomes according to this embodiment $$\omega_{US} = \omega_T - \Delta\omega_{TT us} - \Delta\omega_S \quad (7)$$

where $\Delta\omega_{TTus}$ is the first engine speed difference for upshift points, and the engine speed during downshifts becomes $$\omega_{DS} = \omega_T - \Delta\omega_{TT ds} \quad (8)$$

where $\Delta\omega_{TTds}$ is the first engine speed difference for downshift points.

This embodiment also makes it possible to ensure that the situation of being below a downshift point after an upshift never occurs if it is known that the term $\Delta\omega_{TTds}$ is greater in equation (8) than $\Delta\omega_{TTus}$ in equation (7), a condition which is fulfilled if T is longer for a downshift than for an upshift. This latter condition is fulfilled if parameter T for a downshift is calculated with a factor of more than 1 as compared with parameter T for an upshift. It should be noted that the final term in equation (7) is needed for a shift point for an upshift to be related to an engine speed after changing gear. This means that a gear change has to be simulated backwards in order to arrive at the required shift point. In downshifts there is no need to relate the shift point to an engine speed after changing gear, but rather to an engine speed before changing gear, so the final term in equation (7) is not needed for determination of downshift points.

The inventors have also found that the length of the time period T also affects the drivability of the vehicle 1, so this time period T may be used as a parameter when the drivability is to be controlled. For this reason, an embodiment of the invention uses time period T as an input parameter, since the time period T may be construed as a response time, thereby inter alia affecting the driving sensation for the driver. In another embodiment of the invention, this parameter T may be calibrated to find a suitable value of parameter T.

According to another further embodiment of the invention, the time period T is longer for a downshift point than for an upshift point. The purpose of this is to achieve a more stable gear change system, as explained above.

Figure 4A:
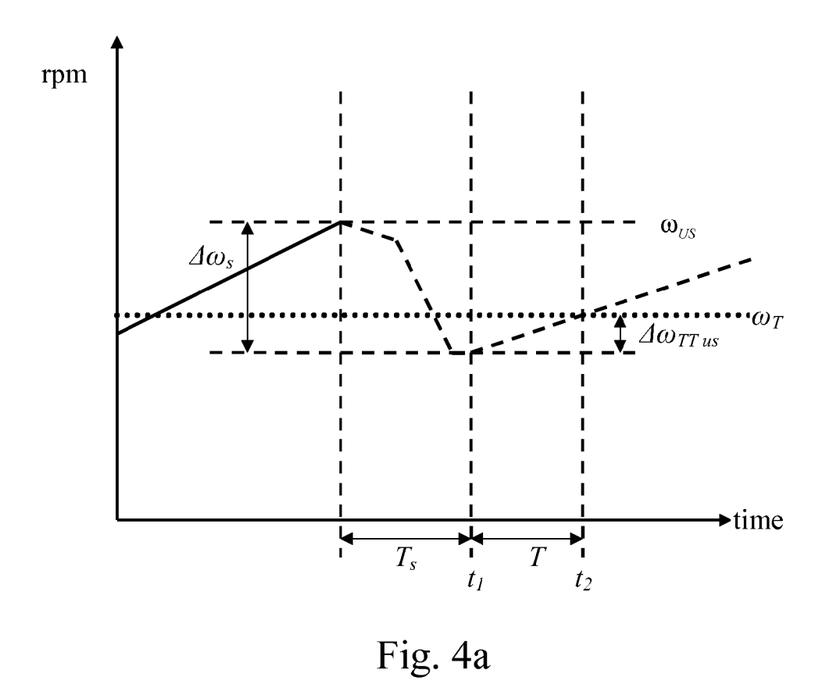
FIG. 4a depicts engine speed as a function of time for an upshift.

FIG. 4a shows how an upshift point can according to an embodiment be calculated by means of an engine target speed $\omega_T$ and an engine speed difference $\Delta\omega_{TT us}$ for an upshift point, in which case the speed difference $\Delta\omega_{TTus}$ is calculated from the time when the gear goes in (time $t_1$ in FIG. 4a) to the time when the engine reaches the target speed $\omega_T$ (time $t_2$ in the diagram). The time between $t_1$ and $t_2$ is the time period T. The time period $T_S$ in FIG. 4a shows only that an upshift is proceeding, but is not used for calculation of the upshift point.

Figure 4B:
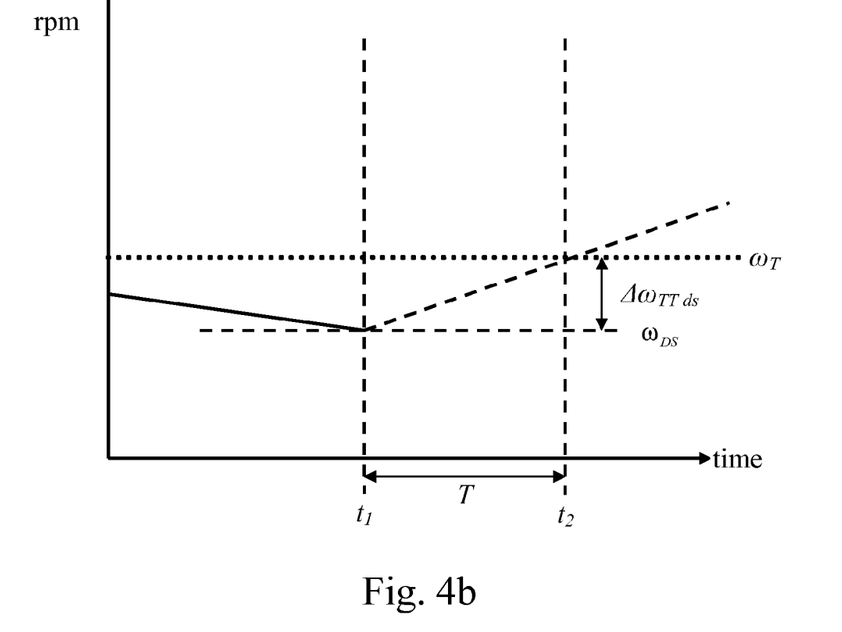
FIG. 4b depicts engine speed as a function of time for a downshift.

The engine speed difference $\Delta\omega_{TT ds}$ is the maximum speed difference allowed between the engine speed and a target speed $\omega_T$ when the engine speed is lower than the target speed $\omega_T$. The engine speed is never allowed to drop below $\omega_T - \Delta\omega_{TT ds}$. Thus the downshift point becomes $\omega_{DS} = \omega_T - \Delta\omega_{TT ds}$, as depicted in FIG. 4b. In calculation of downshift points, T is the maximum time for which it is conceivable to accelerate in order to reach the target speed $\omega_T$ without needing to effect a downward gear change. $\Delta\omega_{TT ds}$ has to be greater than $\Delta\omega_{TT us}$ for the gear change system to be stable, i.e. the engine speed after changing gear may never be lower than the downshift point. FIG. 4b shows the engine speed dropping to the downshift point. At time $t_1$ the accelerator pedal is depressed and the vehicle 1 starts accelerating. The engine speed will then rise to the target speed within the time T. If T were shorter it would mean that gear change was initiated before time $t_1$.

The gearbox 20 is preferably of the kind which forms part of an automated gear change system controlled by a control unit 110, e.g. an electronic control unit (ECU). In such a system, gear changes are effected automatically by the control unit 110 but it is also usual for the driver to be able to execute manual gear changes in such a system, what is known as manual gear change in automatic state (automatic mode). The gearbox 20 also has a plurality of gears, e.g. twelve forward gears and one or more reverse gears are usual in modern trucks.

Specialists will appreciate that a method for determination of one or more shift points according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programable read-only memory), EPROM (erasable PROM), flash memory, EEPROM (electrically erasable PROM), hard disc unit, etc.

The invention also relates to a system for determination of one or more downshift and upshift points. The system comprises at least one control unit (e.g. an ECU for a gearbox 20) adapted to controlling a gearbox 20 in a motor vehicle 1. The gearbox 20 is connected to an engine 10 which drives the gearbox 20 and other parts of the power train. The system is adapted, according to the concept of the invention, to determining said one or more shift points on the basis of an engine target speed $\omega_T$ and a first engine speed difference $\Delta\omega_{TT}$. The target speed $\omega_T$ is a desired engine speed for the engine 10, and the first engine speed difference $\Delta\omega_{TT}$ is a difference between a first engine speed and the target speed $\omega_T$ which are separated by a time period T.

Figure 5:
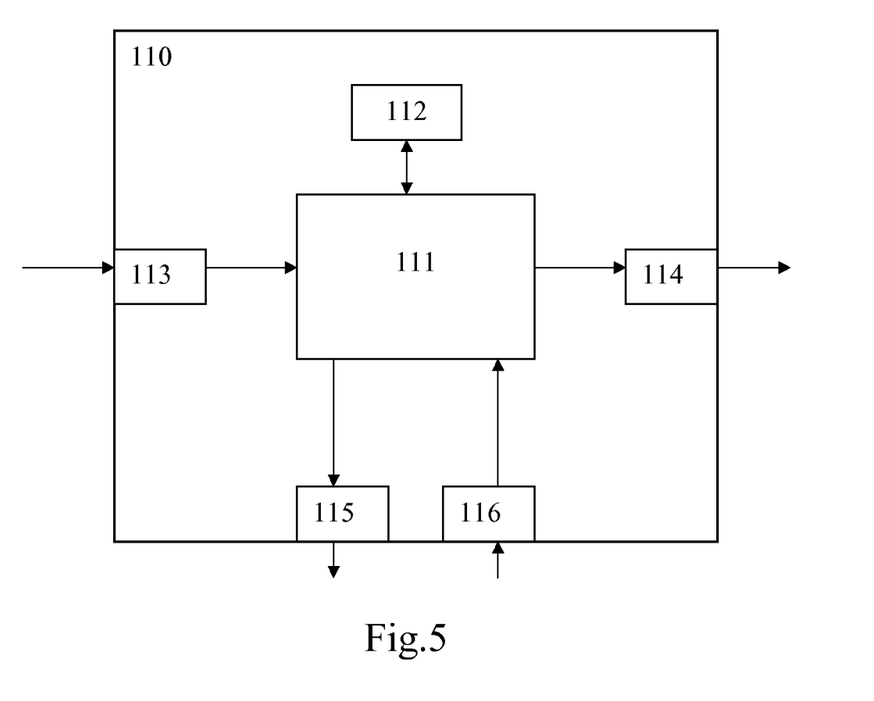
FIG. 5 depicts a control unit forming part of a system according to the invention.

FIG. 5 depicts schematically a control unit 110. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, eg by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the respective devices for respectively receiving input signals and sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Specialists will also appreciate that the above system may be modified according to the various embodiments of the method for determination of shift points according to the invention. The invention relates also to a motor vehicle 1 which comprises at least one system for determination of one or more downshift and upshift points according to the invention.

Finally, the present invention is not limited to its embodiments described above, but relates to and comprises all embodiments within the scope of protection of the attached independent claims.

The invention claimed is:

1. A method for determination of at least one shift point for a gearbox in a motor vehicle, wherein the vehicle comprises an engine, a gearbox connected to the engine, and at least one control unit controlling the gearbox to change gears, the engine driving the gearbox, the method comprising the step of:

assisting in automatically determining the at least one shift point through the at least one control unit, each of the at least one shift point being an engine speed at which the gearbox effects a downshift or an upshift, wherein the at least one shift point is automatically determined on the basis of a desired engine target speed $\omega_T$ and a first engine speed difference $\Delta\omega_{TT}$, which is a difference between a first engine speed at a first time $t_1$ and said desired engine target speed $\omega_T$ at a second time $t_2$, said first and second times $t_1$ and $t_2$ are separated by a time period T, the first time $t_1$ is: (1) a time at which the engine speed reaches a minimum value in the determination of downshift shift points or (2) a time at which the upshift is completed in the determination of upshift shift points, and the time period T begins at the first time $t_1$.

2. The method according to claim 1, wherein, for determination of an upshift shift point, a second engine speed difference $\Delta\omega_S$ between the times when a gear change is initiated and is completed is used in addition to said first engine speed difference $\Delta\omega_{TT}$.

3. The method according to claim 1, wherein the first engine speed difference $\Delta\omega_{TT}$ is different for upshift shift points and downshift shift points respectively.

4. The method according to claim 3, wherein the engine speed for each upshift shift point is defined by $$\omega_{US} = \omega_T - \Delta\omega_{TT\,us} - \Delta\omega_S$$

where $\Delta\omega_{TT\,us}$ represents the first engine speed difference for an upshift shift point;
and each downshift shift point is defined by $$\omega_{DS} = \omega_T - \Delta\omega_{TT\,ds}$$

where $\Delta\omega_{TT\,ds}$ represents the first engine speed difference for a downshift shift point.

5. The method according to claim 1, wherein the time period T is different for upshift shift points and downshift shift points respectively.

6. The method according to claim 5, wherein, in the determination of upshift shift points, the second time $t_2$ is when the speed of said engine reaches the target speed $\omega_T$, and in the determination of downshift shift points, the difference $t_2-t_1$, between the first time $t_1$ and the second time $t_2$, is the maximum time for which the vehicle is allowed to accelerate to reach the target speed $\omega_T$ without a downshift taking place.

7. The method according to claim 1, wherein the time period T is a parameter which affects drivability of said vehicle.

8. The method according to claim 1, wherein the time period T is a calibrated parameter.

9. The method according to claim 1, wherein the at least one shift point is calculated in real time.

10. The method according to claim 1, wherein $\Delta\omega_{TT}$ is defined by $$\Delta\omega_{TT} = \int_{t_1}^{t_2} \frac{M_e - \frac{F_{res}r}{i}}{m + I_e \frac{i^2}{r^2}} dt$$

where $M_e$ is a torque for a flywheel of the engine, $I_e$ is a moment of inertia of the engine and $F_{res}$, r, i and m are respectively a running resistance, a wheel radius, a total transmission ratio and a weight of the vehicle.

11. The method according to claim 1, wherein the time period T for a downshift shift point is longer than the time period T for an upshift shift point.

12. The method according to claim 1, wherein the gearbox is an automatic gearbox or an automated manual gearbox comprising a plurality of gears, and the vehicle is a truck or a bus.

13. The method according to claim 1, wherein the at least one control unit has, stored on a non-transitory computer-readable medium included therein, a computer program comprising program code which, when the program code is executed by a processor of the at least one control unit, causes the at least one control unit to perform the step of assisting in determining the at least one shift point.

14. A method for determination of at least one shift point for a gearbox in a motor vehicle, wherein the vehicle comprises an engine, a gearbox connected to the engine, and at least one control unit controlling the gearbox to change gears, the engine driving the gearbox, the method comprising the step of:

assisting in automatically determining the at least one shift point through the at least one control unit, each of the at least one shift point being an engine speed at which the gearbox effects a downshift or an upshift, wherein the at least one shift point is automatically determined on the basis of a desired engine target speed $\omega_T$ and a first engine speed difference $\Delta\omega_{TT}$, which is a difference between a first engine speed at a first time $t_1$ and said desired engine target speed $\omega_T$ at a second time $t_2$, said first and second times $t_1$ and $t_2$ are separated by a time period T, the first time $t_1$ is: (1) a time at which the engine speed reaches a minimum value in the determination of downshift shift points or (2) a time at which the upshift is completed in the determination of upshift shift points, and the time period T begins at the first time $t_1$, the at least one control unit has, stored on a non-transitory computer-readable medium included therein, a computer program comprising program code which, when the program code is executed by a processor of the at least one control unit, causes the at least one control unit to perform the step of assisting in determining the at least one shift point, and the computer program is stored on the non-transitory computer-readable medium which is within the category which comprises ROM (read-only memory), PROM (programmable ROM), EPROM (erasable PROM), flash memory, EEPROM (electrically erasable PROM) and hard disc unit.

15. A system for determination of at least one shift point for a gearbox of a motor vehicle engine, the engine being connected to the gearbox to drive the gearbox, the system comprising:

at least one control unit configured and operable for controlling the gearbox in the motor vehicle, wherein each of the at least one shift point is an engine speed at which the gearbox effects a downshift or upshift, the at least one control unit being configured and operable to assist in automatically determining the at least one shift point on the basis of an engine target speed $\omega_T$, which is a desired speed for the engine, and a first engine speed difference $\Delta\omega_{TT}$, between a first engine speed at a first time $t_1$ and the engine target speed $\omega_T$ at a second time $t_2$, the first and the second times $T_1$ and $t_2$ are separated by a time period T, the first time $t_1$ is: (1) a time at which the engine speed reaches a minimum value in the determination of downshift shift points or (2) a time at which the upshift is completed in the determination of upshift shift points, and the time period T begins at the first time $t_1$.

16. A motor vehicle comprising at least one system for determination of at least one shift point for a gearbox of a motor vehicle engine, the engine being connected to the gearbox to drive the gearbox, the system comprising:

at least one control unit configured and operable for controlling the gearbox in the motor vehicle, wherein each of the at least one shift point is an engine speed at which the gearbox effects a downshift or upshift, the at least one control unit being configured and operable to assist in automatically determining the at least one shift point on the basis of an engine target speed $\omega_T$, which is a desired speed for the engine, and a first engine speed difference $\Delta\omega_{TT}$, between a first engine speed at a first time $t_1$ and the engine target speed $\omega_T$ at a second time $t_2$, the first and the second times $t_1$ and $t_2$ are separated by a time period T, the first time $t_1$ is: (1) a time at which the engine speed reaches a minimum value in the determination of downshift shift points or (2) a time at which the upshift is completed in the determination of upshift shift points, and the time period T begins at the first time $t_1$.

17. A method for determination of at least one shift point for a gearbox in a motor vehicle, wherein the vehicle comprises an engine, a gearbox connected to the engine, and at least one control unit controlling the gearbox to change gears, the engine driving the gearbox, the method comprising the step of:

assisting in automatically determining the at least one shift point through the at least one control unit, each of the at least one shift point being an engine speed at which the gearbox effects a downshift or an upshift, wherein the at least one shift point is automatically determined on the basis of an engine target speed $\omega_T$ and a first engine speed difference $\Delta\omega_{TT}$, which difference is an increase from a first engine speed at a first time $t_1$ when: (1) the engine speed reaches a minimum value in the determination of downshift shift points or (2) said upshift is completed in the determination of upshift shift points, to said engine target speed $\omega_T$ at a second time $t_2$, said first and second times $t_1$ and $t_2$ are separated by a time period T, and the time period T begins at the first time $t_1$.

18. A method for determination of at least one shift point for a gearbox in a motor vehicle, wherein the vehicle comprises an engine, a gearbox connected to the engine, and at least one control unit controlling the gearbox to change gears, the engine driving the gearbox, the method comprising the step of:

assisting in determining the at least one shift point through the at least one control unit, each of the at least one shift point representing an engine speed at which the gearbox effects a downshift or an upshift, wherein the at least one shift point is determined on the basis of an engine target speed $\omega_T$ and a first engine speed difference $\Delta\omega_{TT}$, which difference is an increase from a first engine speed at a first time $t_1$ when said downshift or said upshift is completed, to said engine target speed $\omega_T$ at a second time $t_2$, and said first and second times $t_1$ and $t_2$ are separated by a time period T, and the engine speed for each upshift shift point is defined by $$\omega_{US} = \omega_T - \Delta\omega_{TT\,us} - \Delta\omega_S$$

where $\Delta\omega_{TT\,us}$ represents the first engine speed difference for an upshift shift point;

and each downshift shift point is defined by $$\omega_{DS} = \omega_T - \Delta\omega_{TT\,ds}$$

where $\Delta\omega_{TT\_ds}$ represents the first engine speed difference for a downshift shift point.

19. A method for determination of at least one shift point for a gearbox in a motor vehicle, wherein the vehicle comprises an engine, a gearbox connected to the engine, and at least one control unit controlling the gearbox to change gears, the engine driving the gearbox, the method comprising the step of:

the at least one control unit assisting in determining the at least one shift point, each of the at least one shift point representing an engine speed at which the gearbox effects a downshift or an upshift, wherein the at least one shift point is determined on the basis of a desired engine target speed $\omega_T$ and a first engine speed difference $\Delta\omega_{TT}$, which is a difference between a first engine speed at a first time $t_1$ and said desired engine target speed $\omega_T$ at a second time $t_2$, said first and second times $t_1$ and $t_2$ are separated by a time period T, the time period T is different for upshift shift points and downshift shift points respectively, in the determination of upshift shift points, the first time $t_1$ is when an upshift is completed and said second time $t_2$ is when the speed of said engine reaches the target speed $\omega_T$, and in the determination of downshift shift points, the difference $t_2-t_1$, between the first time $t_1$ and the second time $t_2$, is the maximum time for which the vehicle is allowed to accelerate to reach the target speed $\omega_T$ without a downshift taking place.

* * * * *